(12) United States Patent  
Xu

(10) Patent No.: US 10,591,604 B2  
(45) Date of Patent: Mar. 17, 2020

(54) CDMA-BASED 3D IMAGING METHOD FOR FOCAL PLANE ARRAY LIDAR

(71) Applicant: NANJING UNIVERSITY OF AERONAUTICS AND ASTRONAUTICS, Jiangsu (CN)

(72) Inventor: Fan Xu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 182 days.

(21) Appl. No.: 15/793,992

(22) Filed: Oct. 26, 2017

(65) Prior Publication Data

US 2018/0267169 A1    Sep. 20, 2018

(30) Foreign Application Priority Data

Mar. 14, 2017  (CN) .......................... 2017 1 0150139

(51) Int. Cl.
| | | |
|---|---|---|
| G01S 17/89 | (2020.01) | |
| G01S 7/481 | (2006.01) | |
| G01S 7/486 | (2020.01) | |
| G01S 7/487 | (2006.01) | |
| G01S 7/4865 | (2020.01) | |
| G01S 7/4863 | (2020.01) | |

(52) U.S. Cl.
CPC .............. *G01S 17/89* (2013.01); *G01S 7/487* (2013.01); *G01S 7/4818* (2013.01); *G01S 7/4863* (2013.01); *G01S 7/4865* (2013.01)

(58) Field of Classification Search
None
See application file for complete search history.

(56) References Cited

U.S. PATENT DOCUMENTS

| 2012/0075615 A1* | 3/2012 | Niclass | ................. G01S 7/4814 356/5.01 |
|---|---|---|---|
| 2018/0081041 A1* | 3/2018 | Niclass | ................. G01B 11/22 |

OTHER PUBLICATIONS

Xu, Fan, and Yuanqing Wang. "Signal enhancement of a novel multi-address coding lidar backscatters based on a combined technique of demodulation and wavelet de-noising." Optics and Lasers in Engineering 74 (2015): 122-129. (Year: 2015).*

(Continued)

*Primary Examiner* — Vu Le  
*Assistant Examiner* — Tracy Mangialaschi  
(74) *Attorney, Agent, or Firm* — JCIPRNET

(57) ABSTRACT

A focal plane array light detection and ranging 3D imaging method based on a code division multiple access technique is provided. A narrow laser pulse is shaped into a flat-top beam. The shaped beam is space-time encoded by a focal plane array-based optical encoder. The encoded beam is projected onto the target. The echo signals are obtained by a collecting lens. According to the encoding rule, the signals are grouped and multiplexed into several channels; subsequently, the multi-channel multiplexed signals are captured by a focal plane array detector and converted by a multi-channel digitizer. The multi-channel encoded full waveform signals are acquired from the digitizer by a PC terminal. The encoded full waveforms can be demodulated into the flight ranges for all subpixels via signal processing. By orthogonal range correction and pixel splicing and integrating the geographical data of all pixels, the 3D image reconstruction of the target can be accomplished.

3 Claims, 7 Drawing Sheets

(56) References Cited

OTHER PUBLICATIONS

Xu F, Wang Y, Li F. Pixel multiplexing technique for real-time three-dimensional-imaging laser detection and ranging system using four linear-mode avalanche photodiodes. Review of Scientific Instruments. Mar. 29, 2016;87(3):033112. (Year: 2016).*

Xu F, Wang Y, Yang X, Zhang B, Li F. Correction of linear-array lidar intensity data using an optimal beam shaping approach. Optics and Lasers in Engineering. Mar. 25, 2016;83:90-98. (Year: 2016).*

* cited by examiner

CDMA-BASED 3D IMAGING METHOD FOR FOCAL PLANE ARRAY LIDAR

CROSS-REFERENCE TO RELATED APPLICATION

This application claims the priority benefit of China application serial no. 201710150139.8, filed on Mar. 14, 2017. The entirety of the above-mentioned patent application is hereby incorporated by reference herein and made a part of this specification.

BACKGROUND OF THE INVENTION

Field of the Invention

The present invention relates to a 3D imaging method for a focal plane array LIDAR and specifically to a code division multiple access (CDMA)-based 3D imaging method for a focal plane array LIDAR, belonging to the field of laser 3D imaging technologies or laser remote sensing technologies.

Description of Related Art

LIDAR, short for light detection and ranging, is an active photoelectric imaging technology. It is widely applied not only in the military field for laser guidance, battlefield reconnaissance, aircraft collision prevention, landmine detection, etc. but also in the scientific domain for urban mapping, forest ecological monitoring, seabed environment reconstruction, geological surveys, space surveys, etc.

LIDAR technology is developed on the basis of traditional microwave radar technology. Therefore, there are many similarities in the working principle and system structure between the two technologies. On the one hand, although the emission sources of both LIDAR and microwave radar belong to the electromagnetic spectrum, the difference is that the former operates at optical frequencies while the latter operates at radio frequencies. On the other hand, structurally speaking, the antenna of a microwave radar system corresponds to the optical telescope of a LIDAR system. LIDAR employs photodetectors to convert the optical signal to an electrical signal for subsequent processing while microwave radar directly uses a radio frequency (RF) module for amplification, mixing, and demodulation of the signal. In terms of signal processing, LIDAR utilizes many mature technologies of microwave radar.

Compared with microwave radar, LIDAR possesses many unique advantages. First, benefiting from a laser's narrower pulse and wider bandwidth, LIDAR data provide more accurate measurements. Second, as the operating frequency of a laser is beyond the electronic interference spectrum and microwave stealth frequency, LIDAR has good anti-electronic interference and anti-stealth capabilities. Third, the excellent monochromaticity and coherence of the laser make LIDAR a highly sensitive heterodyne interferometer. Fourth, the LIDAR echo contains a variety of information such as range, angle, and velocity, which contributes to more abundant 3D images. Finally, a LIDAR system is generally small and light and is thus more suitable for vehicle-borne, airborne, and even spaceborne usage.

As an important application of LIDAR, imaging LIDAR is capable of acquiring the outline and location information of a target for 3D image reconstruction and target recognition. Based on the measurement mode, imaging LIDAR can be categorized into two types: scanning imaging LIDAR and non-scanning imaging LIDAR.

A scanning imaging LIDAR is operated by scanning the object point-by-point with a mechanical scanning device, which not only increases the size and the weight but also results in bias.

By contrast, a non-scanning imaging LIDAR can capture the vertical distributions of wider areas without scanning. The range information is obtained by waveform decomposition or demodulation algorithms. However, current algorithms may result in significantly lower range accuracy.

With an increasing demand for improving the imaging quality of a non-scanning imaging LIDAR, focal plane array LIDAR systems have emerged and are researched worldwide. A focal plane array LIDAR employs a multi-element avalanche-photodiode (APD) array to capture the echo signals of a surface. A multi-channel read-out integrated circuit (ROIC) obtains the range information for all pixels and finally reconstructs the target map. Compared with other types of LIDAR, a focal plane array LIDAR presents particular advantages. First, the utilization rate of the laser energy is relatively high, which facilitates scannerless multi-pixel detection. Second, the time-of-flight principle that the system is based on is very direct and simple. Third, the highly sensitive and precise APD array results in low detection noise, long detection range, high number of imaging frames, and high precision. Furthermore, focal plane array LIDAR systems are convenient for use in vehicle-borne or airborne platforms, which are widely used in the military field.

(1) Since 2002, the Lincoln Laboratory at the Massachusetts Institute of Technology (MIT) has made considerable effort to develop a flash LIDAR system with a Geiger-mode APD (GM-APD) focal plane array. From 2002 to 2005, three generations of GM-APD systems were developed. Accordingly, the size of the APD array was scaled up from 4×4 to 32×32. In 2005, MIT integrated their 32×32 GM-APD LIDAR system into the Jigsaw system to detect and identify camouflaged and foliage-obscured targets. In 2011, the Lincoln Laboratory completed the development of an Airborne Ladar Imaging Research Testbed (ALIRT) system with the support of the U.S. Air Force. ALIRT utilizes a 32×128 GM-APD focal plane array with a timing module to achieve rapid 3D imaging from altitudes up to 9000 m.

(2) In 2004, with the support of the Defense Advanced Research Projects Agency (DARPA), Advanced Scientific Concepts Inc. (ASC) completed the development of a scannerless 3D imaging LIDAR. The core component is a multi-functional and large-scale ROIC that works in conjunction with an InGaAs or HgCdTe APD array to accomplish imaging. The sizes of the APD array and the ROIC are 128×128 for target imaging in camouflaged, smoky, and underwater environments.

(3) In 2007, with the support of the Night Vision and Electronic Sensors Directorate (NVESD), DRS Inc. developed a range-gated infrared (IR) imaging LIDAR system. The system used a 128×128 mid-wave infrared (MWIR) HgCdTe electron APD array that operates at bandwidths of 3-5 µm for passive mode operation and 1.55 µm for active mode operation.

(4) In 2010, with the support of NASA Langley, Raytheon Inc. conducted the autonomous precision landing and hazard avoidance technology (ALHAT) program and developed the 4th generation product: a 256×256 HgCdTe APD and ROIC, which was applied to accurate and safe moon landings.

(5) In 2010, with the support of the European Space Agency, the European Southern Observatory and SELEX Galileo Infrared Ltd jointly developed 320×256 HgCdTe electron APD arrays with cutoff wavelengths of ~2.64 μm.

(6) In 2010, with the support of the French Ministry of Defense (MOD) (DGA), CEA Leti developed a novel 320×256 hybrid focal plane array LIDAR that is capable of completing both passive thermal imaging and active flash imaging.

In summary, large-scale and ultra-large-scale APD focal plane arrays have been developed and integrated into LIDAR systems by many countries. As shown in Table 1, the largest array scale is 320×256, which means over 80,000 pixels can be acquired simultaneously under scannerless conditions. However, the conventional measurement method whereby imaging resolution relies on the array scale limits the further development of LIDAR systems. This is the reason why the Lincoln Laboratory has only improved the imaging resolution to 256×64 over nearly two decades and this is still far less than their expected resolution of 300,000 pixels. Simply upgrading the APD array scale to improve the imaging resolution not only increases the difficulty of hardware design and the cost but also hampers the system's miniaturization and integration. Therefore, it is essential to abandon the conventional LIDAR detection method and employ technical means to solve the contradiction between small-scale detectors and high resolution in order to achieve scannerless, large field-of-view, high-accuracy, and high-resolution imaging performance.

TABLE I

State of the art of focal plane array LIDAR systems

| Country | Research Institute | Array scale | Year |
|---|---|---|---|
| U.S. | ASC, Inc. | 128 × 128 | 2004 |
| U.S. | DRS, Inc. | 128 × 128 | 2007 |
| U.S. | MIT Lincoln Lab. | 256 × 64 | 2009 |
| U.S. | Raytheon, Inc. | 256 × 256 | 2010 |
| U.K. | Selex Galileo, Inc. | 320 × 256 | 2010 |
| France | CEA-Leti, Inc. | 320 × 256 | 2010 |

SUMMARY OF THE INVENTION

Technical Problem

The objective of the present invention is to propose a CDMA-based 3D imaging method for focal plane array LIDAR to overcome the limitations involved in the design and production of large-scale arrays. The proposed method does not follow convention in that the array scale determines the imaging resolution and instead creates a new mechanism in which code determines the imaging resolution. For instance, when a $2^N \times 2^N$ encoder and an M-element APD array are used, $M \times 2^{2N}$ pixel resolution will be reached, where both M and N are positive integers. This means that high-resolution, scannerless, and real-time entire-surface 3D imaging can be achieved with small-scale detectors.

Technical Solution

In order to achieve the aforementioned objective, the technical solution of the CDMA-based 3D imaging method for the focal plane array LIDAR is described as follows:

(1) First, the pulsed laser is shaped into a flat-top laser beam by a beam shaper. The shaped laser beam is then divided into $2^N \times 2^N$ sections by a $2^N \times 2^N$-element encoder, where N is a positive integer. The $2^N \times 2^N$ sections of the laser beam are sequentially encoded with a $2^{2N}$-order code by an on-off control of encoder.

(2) Second, an M-element detector array is employed to subdivide the $2^N \times 2^N$ encoded sections into $M \times 2^N \times 2^N$ subsections so that the detector elements multiplex the echo signals of the $2^N \times 2^N$ points whose code attributes are mutually orthogonal. Hence, echo signals from $M \times 2^{2N}$ object points are completely received by a single M-element detector array.

(3) Third, the multiplexed M-channel signals are digitally converted to M groups of encoded full waveforms by an M-channel digitizer. With effective signal processing algorithms, the range information for the $M \times 2^{2N}$ pixels is accurately obtained for 3D imaging.

Considering the structural symmetry of plane detection and the ability to implement $2^{2N}$-order encoding, the encoder mentioned in (1) is plane-array designed and has $2^N \times 2^N$ elements. Accordingly, the cross-section of the laser beam is divided into $2^N \times 2^N$ sections, which are sequentially $2^{2N}$-order encoded so that the code attributes of all sections are mutually orthogonal. For example, the encoder is designed with the Walsh-Hadamard code, in which the digit value "1" represents the light can pass and the digit value "0" the light is stopped. The light pass and stop can be respectively operated by on and off control of the encoder. As the code is a focal plane array, both time and space dimensions are encoded to reduce the data redundancy and facilitate the subsequent accurate demodulation.

As mentioned in (2), the detector array actually divides the original sections into more subsections and multiplexes the signals from them. Assuming $M = M_1 \times M_2$ where $M_1$ and $M_2$ are integers, the $2^N \times 2^N$ sections marked with $S_1, S_2, \ldots S_{2^{2N}}$ are uniformly subdivided into $M_1 2^N \times M_2 2^N$ subsections that can be marked with $\{S_{1,1}, S_{2,1}, \ldots S_{M,1}\}$, $\{S_{1,2}, S_{2,2}, \ldots S_{M,2}\}, \ldots (\{S_{1,2^{2N}}, S_{2,2^{2N}}, \ldots S_{M,2^{2N}}\}$. Since $M_1 \times M_2$ subsections within each pixel correspond to the same code cell, M groups are assigned as $\{S_{1,1}, S_{1,2}, \ldots S_{1,2^{2N}}\}, \{S_{2,1}, S_{2,2}, \ldots S_{2,2^{2N}}\}, \ldots \{S_{M,1}, S_{M,2}, \ldots S_{M,2^{2N}}\}$. Thus, each of the M groups is a complete encoding group. Therefore, the M groups of pixels are multiplexed by optical fiber bundles and captured by an M-element detector array. As a result, the M-element detector array actually receives M-channel encoded echo signals that contain $M \times 2^{2N}$ subpixels.

The signal processing algorithm for the M groups of encoded full waveforms mentioned in (3) involves the following parts. (a) pre-denoising: on the basis of avoiding a loss of detail, a denoising algorithm is implemented to pre-denoise the waveforms within the entire encoding period; (b) demodulation (or decoding): the local code sequences are correlated with the i-th group of encoded full waveforms to obtain the characteristic waveforms of $2^{2N}$ pixels involving the $2^{2N}$ time-of-flight (TOF) information $\{t_{i,1}, t_{i,2}, \ldots t_{i,2^{2N}}\}$ of sections $\{S_{i,1}, S_{i,2}, \ldots S_{i,2^{2N}}\}$ where i=1, 2, . . . M; (c) denoising: smoothing and denoising algorithms are used to enhance the characteristic waveforms; (d) decomposition: a fitting algorithm and laser parameters are used to decompose the $M \times 2^{2N}$ TOF values $\{t_{i,j}\}$, i=1, 2, . . . M and obtain the direct flight ranges of the $M \times 2^{2N}$ pixels $\{r_{i,j}\}$ with the equation $r_{i,j} = c \cdot t_{i,j}/2$ where c represents the light velocity; (e) focal plane array 3D reconstruction: according to the spatial distribution and field of view (FOV) of all pixels in the orthographic projection model, the direct range values are revised to orthographic range values as pixel depth values to construct the 2D range image. The range image and the GPS data are combined into a 3D image of the target.

The demodulation algorithm mentioned in (b), namely the decoding algorithm, represents a key step. The M-channel encoded full waveforms acquired from the M-element detector array have to be processed by the demodulation algorithm to obtain the feature information of all pixels. Benefiting from the code's orthogonality, a local decoding matrix is utilized to decompose the $M \times 2^{2N}$ pixels. Assuming the local code matrix is described by $\overline{WH}_{N'} = [\bar{h}_1, \bar{h}_2 \ldots \bar{h}_{N'}]^T$ where $N' = 2^{2N}$, it is required that $\overline{WH}_{N'}$ is bipolar and orthogonal to the original encoding matrix, i.e., $WH_{N'} \times \overline{WH}_{N'}^T$ is a diagonal matrix. Under this condition, the i-th group of encoded full waveforms can be demodulated to the characteristic waveforms of the $2^{2N}$ pixels involving $2^{2N}$ TOF information $\{t_{i,1}, t_{i,2}, \ldots t_{i,2^{2N}}\}$ sequentially extracted from the $2^{2N}$ sections $\{S_{i,1}, S_{i,2}, \ldots S_{i,2^{2N}}\}$ where $i=1, 2, \ldots M$.

The focal plane array 3D reconstruction mentioned in (e) includes the following three steps: step 1, the direct flight ranges of the M groups of pixels obtained by the M detectors are first transformed according to the equation $$\hat{r}_{i,j} = \sqrt{r_{i,j}^2 - (M_1 2^{N-1} - x_{i,j})^2 \Delta l_1^2 - (M_2 2^{N-1} - y_{i,j})^2 \Delta l_2^2}$$

where $M = M_1 \times M_2$, $i=1, 2, \ldots M$ $j=1, 2, \ldots 2^{2N}$, $x_{i,j} = M_1(j \bmod 2^N - 1) + i \bmod M_1$, $y_{i,j} = M_2 j/2^N + i/M_1 + 1$, $\Delta l_1 = l_1/M_1 2^N$, and $\Delta l_2 = l_2/M_2 2^N$; step 2, the 2D coordinate system xOy is created. The transformed $M \times 2^{2N}$ range values are the orthographic range values that are mapped as the pixel depth values of the image for the pixel locations $(x_{i,j}, y_{i,j})$, $i=1, 2, \ldots M$; $j=1, 2, \ldots 2^{2N}$, thereby accomplishing the 2D range image reconstruction. The horizontal and vertical pixel resolutions are $\Delta l_1$ and $\Delta l_2$ respectively; step 3, after combining the range image with the GPS data of all pixels, the 3D image of the target is finally restored.

Advantageous Effects

The advantageous effects include the following:

(1) The presented focal plane array LIDAR uses a plane array detection mode that provides scannerless, large-FOV, real-time remote sensing, thereby achieving a "staring" 3D imaging.

(2) The CDMA technique is applied to the focal plane array LIDAR. On the one hand, it reduces the information redundancy of the $2^{2N}$ target pixels by labeling them with orthogonal codes and achieves an accurate range demodulation of the pixels. On the other hand, the multiplexing technique achieves high-resolution 3D imaging with small-scale detectors, i.e., $M \times 2^{2N}$ subpixels with only an M-element detector array.

(3) Considering (1) and (2), the 256×64 (i.e., $M=2^{14}$) APD array developed by the Lincoln Laboratory can achieve 268-million pixels per frame for 3D imaging when combined with a 128×128 (i.e., $2^N = 2^{14}$) focal plane array encoder.

BRIEF DESCRIPTION OF THE DRAWINGS

The present invention is further described below with reference to the accompanying drawings.

DETAILED DESCRIPTION OF THE INVENTION

A detailed description of the invention is provided as follows on the basis of the accompanying drawings.

Figure 1:
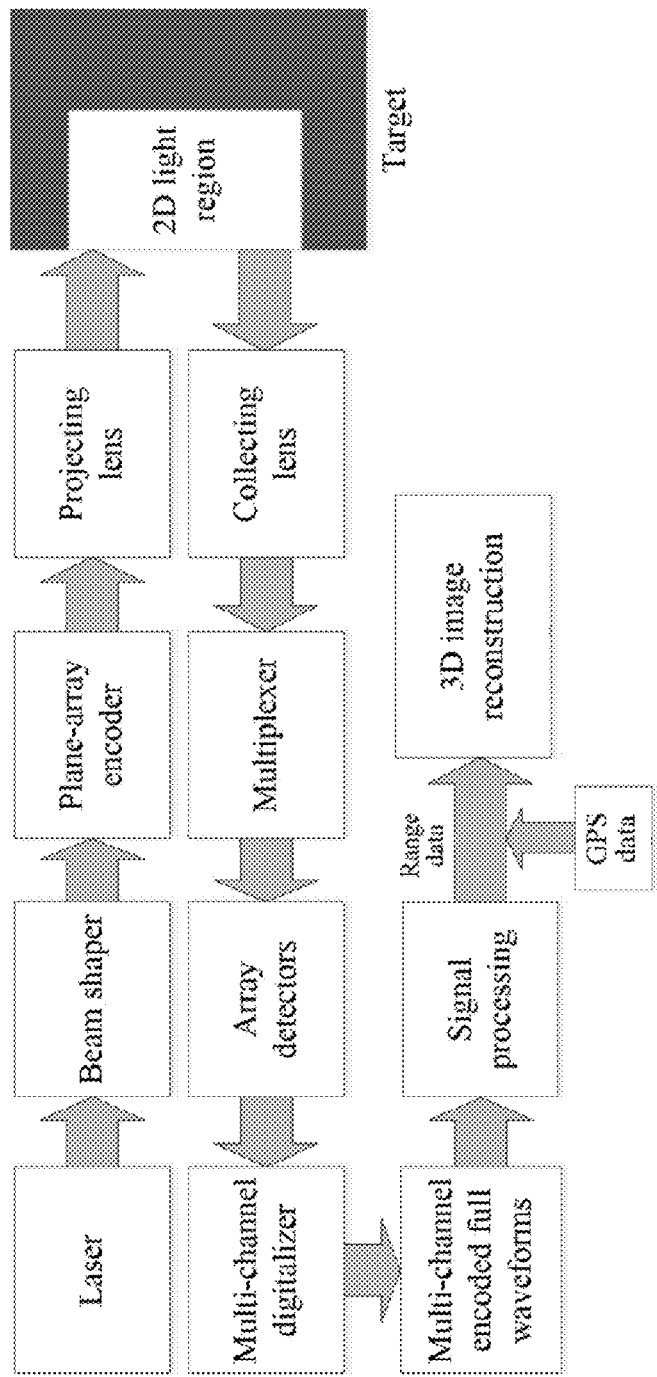
FIG. 1 is a flowchart of the CDMA-based 3D imaging method for the focal plane array LIDAR.

As shown in FIG. 1, the presented CDMA-based 3D imaging method for the focal plane array LIDAR consists of three components involving emission, receiving, and signal processing. The emission process consists of laser shaping and encoding, while the receiving process executes the collection and multiplexing. The signal processing involves signal enhancement, signal demodulation, parameter extraction, and 3D image reconstruction. Compared with a conventional LIDAR imaging method, three modules including laser shaping, encoding, multiplexing, and signal demodulation are added to achieve a large FOV, low data redundancy, a high coefficient of detector utilization, and high range precision. The detailed operation is as follows. The laser is shaped into a flat-top beam and further encoded by a focal plane array encoder. For example, if the size of the encoder is $2^N \times 2^N$, the laser is $2^{2N}$-order encoded in both space and time dimensions. The encoded laser beam is projected to the surface and the illuminated region is thus divided into $2^N \times 2^N$ sections. The backscattered signals are collected by the collecting lens and multiplexed into M-channel encoded full signals, which are captured by the M-element detector array. Each channel of an encoded full signal involves $2^{2N}$ pixel range information, which can be obtained by signal processing algorithms. In total, $M \times 2^{2N}$ pixel ranges can be obtained for the 3D image reconstruction of the target.

Figure 2:
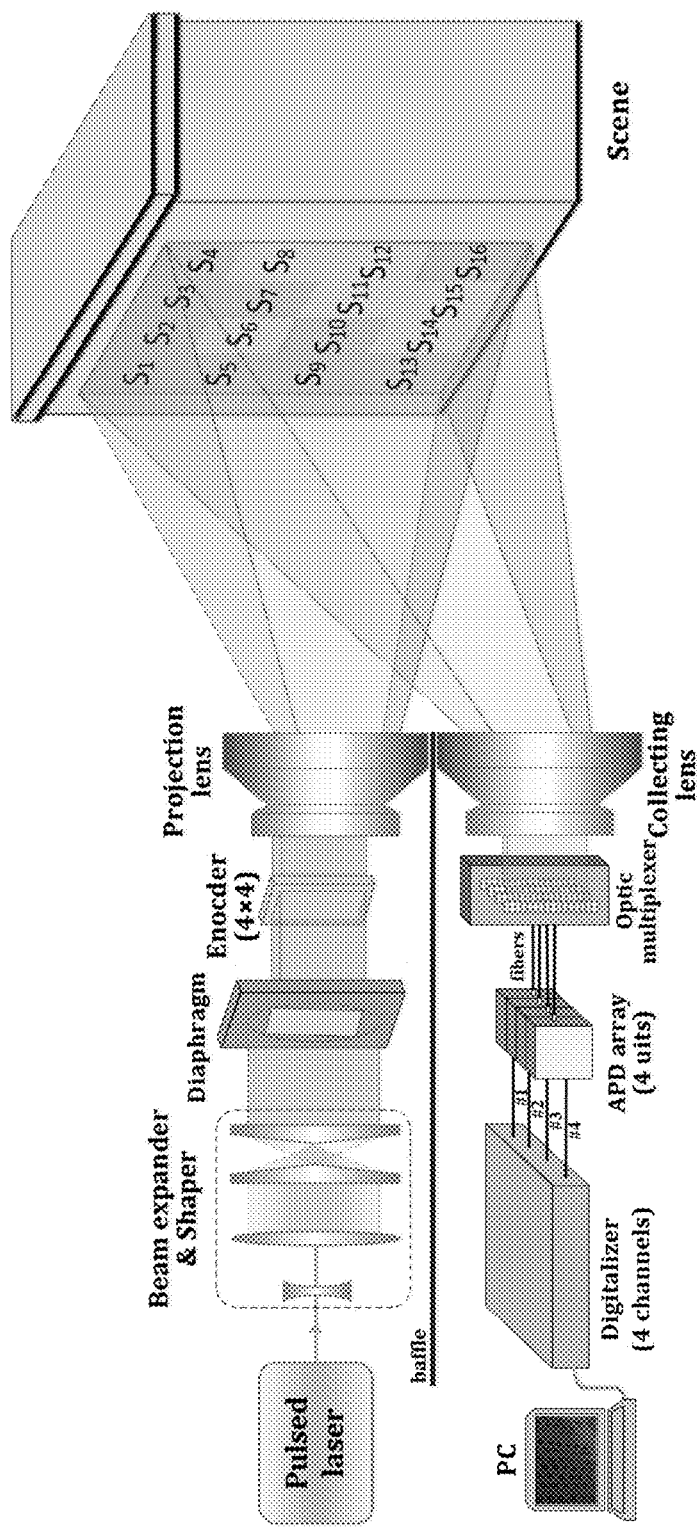
FIG. 2 is a structural schematic diagram of a 4×4 CDMA-based focal plane array LIDAR 3D imaging system.

FIG. 2 is an embodiment of FIG. 1, presenting a structural schematic diagram of a 4×4 CDMA-based focal plane array LIDAR 3D imaging system. As N=2 and M=4, the encoding size is 4×4 and the detector scale is 4. In order to avoid laser interference, a baffle plate is added between the emission side and the receiver side of the LIDAR system. The operation of emission is as follows: the laser produces a laser pulse of a certain wavelength, width, and pulse repetition frequency (PRF). For example, the wavelength is 532 nm, the pulse width is 10 ns, and the PRF is 10 kHz. The laser pulse is then expanded to a large-diameter laser beam and further shaped into a flat-top beam. The shaped beam is further shaped and encoded to a rectangle-section encoded beam by the diaphragm and the encoder before being projected onto the scene. In the embodiment, the concave and convex lens set is used as the beam expander and a pair of conical lenses serves as the beam shaper. In addition, the diaphragm shape is a square and the optical encoder has 4×4 square elements. The code designed for the encoder is a unipolar Walsh-Hadamard matrix of the order 16, which is expressed as:

$$WH_{16} = \begin{bmatrix} S_1 \\ S_2 \\ S_3 \\ S_4 \\ S_5 \\ S_6 \\ S_7 \\ S_8 \\ S_9 \\ S_{10} \\ S_{11} \\ S_{12} \\ S_{13} \\ S_{14} \\ S_{15} \\ S_{16} \end{bmatrix} = \begin{bmatrix} 1&1&1&1&1&1&1&1&1&1&1&1&1&1&1&1 \\ 1&0&1&0&1&0&1&0&1&0&1&0&1&0&1&0 \\ 1&1&0&0&1&1&0&0&1&1&0&0&1&1&0&0 \\ 1&0&0&1&1&0&0&1&1&0&0&1&1&0&0&1 \\ 1&1&1&1&0&0&0&0&1&1&1&1&0&0&0&0 \\ 1&0&1&0&0&1&0&1&1&0&1&0&0&1&0&1 \\ 1&1&0&0&0&0&1&1&1&1&0&0&0&0&1&1 \\ 1&0&0&1&0&1&1&0&1&0&0&1&0&1&1&0 \\ 1&1&1&1&1&1&1&1&0&0&0&0&0&0&0&0 \\ 1&0&1&0&1&0&1&0&0&1&0&1&0&1&0&1 \\ 1&1&0&0&1&1&0&0&0&0&1&1&0&0&1&1 \\ 1&0&0&1&1&0&0&1&0&1&1&0&0&1&1&0 \\ 1&1&1&1&0&0&0&0&0&0&0&0&1&1&1&1 \\ 1&0&1&0&0&1&0&1&0&1&0&1&1&0&1&0 \\ 1&1&0&0&0&0&1&1&0&0&1&1&1&1&0&0 \\ 1&0&0&1&0&1&1&0&0&1&1&0&1&0&0&1 \end{bmatrix} \quad (1)$$

Here, the rows of the matrix represent the space dimension and the columns the time dimension. The value "1" indicates that the light passes through and "0" indicates that the light is stopped, both of which can be controlled by an on-off control of the encoder. $S_1, S_2, \ldots S_{16}$ are the 4×4 sections onto which the encoded laser beam is projected. For instance, sixteen "1" are projected to section $S_1$, which means the section is always illuminated within 16 time intervals. The operation of the receiver is as follows: the backscattered echo signals are collected by the collecting lens and are then transmitted to the multiplexer. Since the number of detector elements is 4 in the embodiment, each of the 4×4 sections $S_1, S_2, \ldots S_{16}$ is further divided into 4 subsections as in $\{S_{1,1}, S_{2,1}, S_{3,1}, S_{4,1}\}$, $\{S_{1,2}, S_{2,2}, S_{3,2}, S_{4,2}\}$, ..., $\{S_{1,16}, S_{2,16}, S_{3,16}, S_{4,16}\}$. As the 4 subsections within the same sections have the same code attribute, the multiplexer picks out the same-order 16 subsections within different sections and unites them, thus producing 4 bundles: $\{S_{1,1}, S_{1,2}, \ldots S_{1,16}\}$, $\{S_{2,1}, S_{2,2}, \ldots S_{2,16}\}$, $\{S_{3,1}, S_{3,2}, \ldots S_{3,16}\}$ and $\{S_{4,1}, S_{4,2}, \ldots S_{4,16}\}$. Each bundle possesses a complete Walsh-Hadamard code attribute. The 4 bundles are further connected to the 4-element APD array and the 4-channel digitizer. Subsequently, 4 groups of encoded full waveforms are obtained. In the embodiment, the sampling rate is 1 GHz while the pulse width is 10 ns so that the encoded full waveforms can be reconstructed without distortion. The 64 subpixels involved in the 4 groups of encoded full waveforms can be decomposed by signal demodulation. Overall, the result shows that the multiplexing technique achieves an enhancement in the detector utilization and that the encoding technique reduces the data redundancy and facilitates high-precision demodulation.

Figure 3:
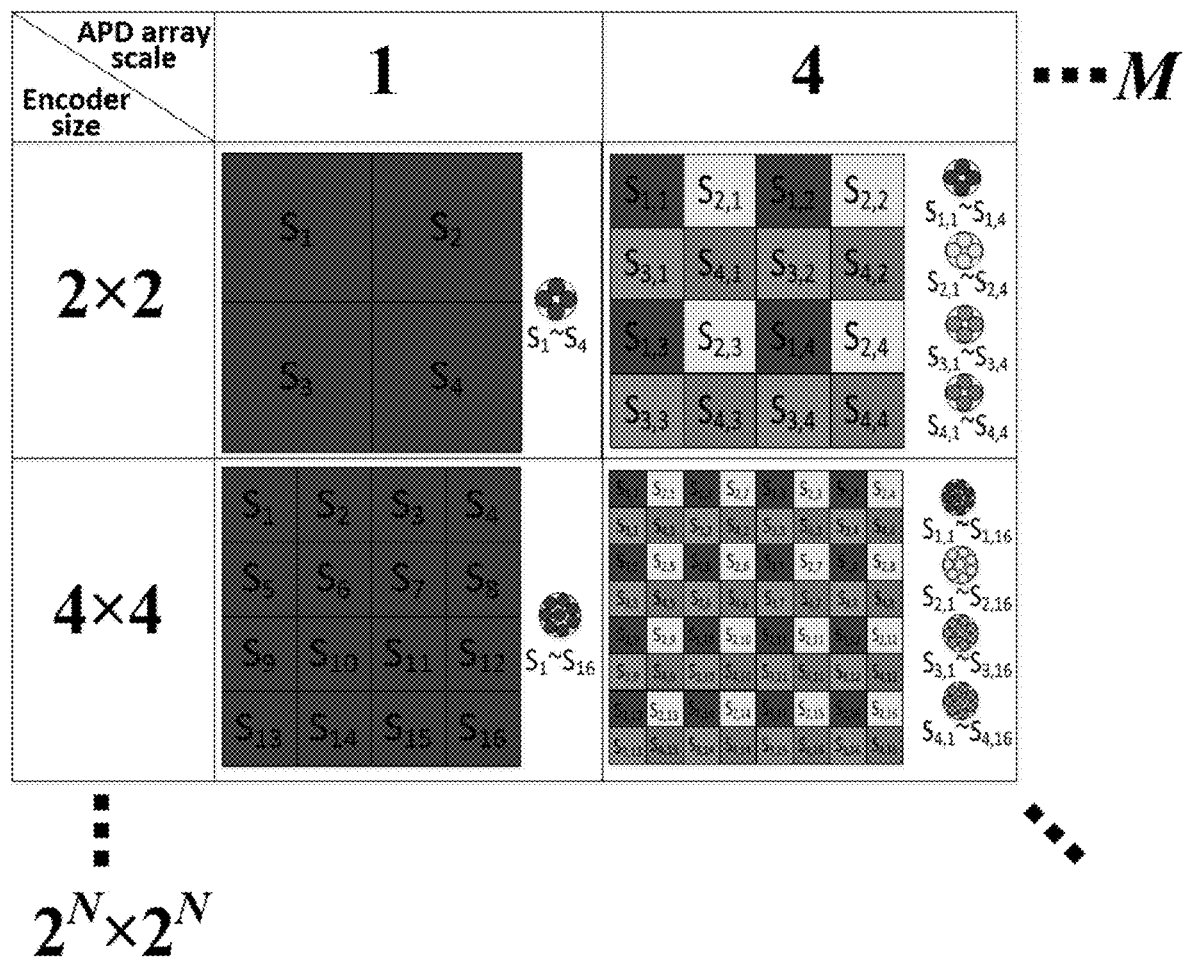
FIG. 3 is a schematic diagram of the multiplexing rule of different sizes of encoders and different scales of APD arrays.

FIG. 3 is a schematic diagram representing the multiplexing rule of different sizes of encoders and different scales of APD arrays. (1) When N=1 and M=1, the size of the encoding plane is 2×2, thereby dividing the illuminated region into 4 sections $S_1, S_2, S_3$, and $S_4$, whose echo signals are multiplexed and captured by a single APD. (2) When N=1 and M=4, the size of the encoding plane is still 2×2, resulting in 4 sections. When the number of APD elements is 4, each of the 4 sections is uniformly divided into 2×2 subsections. The 4 groups of subsections are marked by $\{S_{1,1}, S_{2,1}, S_{3,1}, S_{4,1}\}$, $\{S_{1,2}, S_{2,2}, S_{3,2}, S_{4,2}\}$, $\{S_{1,3}, S_{2,3}, S_{3,3}, S_{4,3}\}$, and $\{S_{1,4}, S_{2,4}, S_{3,4}, S_{4,4}\}$. The subsections of each group share the same code element. To execute multiplexing, subsections of different groups are regrouped and multiplexed. As shown, $\{S_{1,1}, S_{1,2}, S_{1,3}, S_{1,4}\}$, $\{S_{2,1}, S_{2,2}, S_{2,3}, S_{2,4}\}$, $\{S_{3,1}, S_{3,2}, S_{3,3}, S_{3,4}\}$, and $\{S_{4,1}, S_{4,2}, S_{4,3}, S_{4,4}\}$ are 4 new groups. Considering that each group has a complete encoding attribute, 4-channel encoded full waveforms are produced and can be decomposed using the code's orthogonality, thus being respectively transmitted to the 4-element APD array via fiber bundles. (3) When N=2 and M=1, the size of the encoding plane is still 4×4, resulting in 16 sections marked by $S_1, S_2, \ldots S_{16}$, which are captured by a single APD. (4) When N=2 and M=4, the size of the encoding plane is still 4×4, resulting in 16 sections marked by $S_1, S_2, \ldots, S_{16}$. When the number of APD elements is 4, the sections are further divided into the subsections $\{S_{1,1}, S_{2,1}, S_{3,1}, S_{4,1}\}$, $\{S_{1,2}, S_{2,2}, S_{3,2}, S_{4,2}\}$, ..., $\{S_{1,16}, S_{2,16}, S_{3,16}, S_{4,16}\}$. Subsequently, 4 new groups possessing complete encoding attributes are reassigned as $\{S_{1,1}, S_{1,2}, \ldots S_{1,16}\}$, $\{S_{2,1}, S_{2,2}, \ldots S_{2,16}\}$, $\{S_{3,1}, S_{3,2}, \ldots S_{3,16}\}$, and $\{S_{4,1}, S_{4,2}, \ldots S_{4,16}\}$, thus being captured by the 4-element APD array. This shows that the signals of 64 pixels are finally obtained with only a 4-element APD array. We can deduce the other conditions from the foregoing rule. Generally, when the size of the encoding plane is $2^N \times 2^N$, the target is divided into $2^{2N}$ sections of the form $S_1, S_2, \ldots S_{2^{2N}}$. Further, when the number of APD elements is M, the sections are subdivided into M groups as in $\{S_{1,1}, S_{2,1}, \ldots S_{M,1}\}$, $\{S_{1,2}, S_{2,2}, \ldots S_{M,2}\}$, ..., $\{S_{1,2^{2N}}, S_{2,2^{2N}}, \ldots S_{M,2^{2N}}\}$, which are regrouped into $\{S_{1,1}, S_{1,2}, \ldots S_{1,2^{2N}}\}$, $\{S_{2,1}, S_{2,2}, \ldots S_{2,2^{2N}}\}$, ..., $\{S_{M,1}, S_{M,2}, \ldots S_{M,2^{2N}}\}$ and multiplexed to the M-element APD array via fiber bundles. Consequently, the multiplexing operation achieves the collection of $M \times 2^{2N}$ pixels with only an M-element APD array. It is noteworthy that FIG. 3 shows a special case in which $\sqrt{M}$ is an integer so that each square section can be divided into $\sqrt{M} \times \sqrt{M}$ square subsections. In this case, the horizontal resolution and vertical resolution are equal. Under normal conditions, i.e., $M = M_1 \times M_2$ where $M_1$ and $M_2$ are positive integers, the foregoing rule is unchanged.

Figure 4:
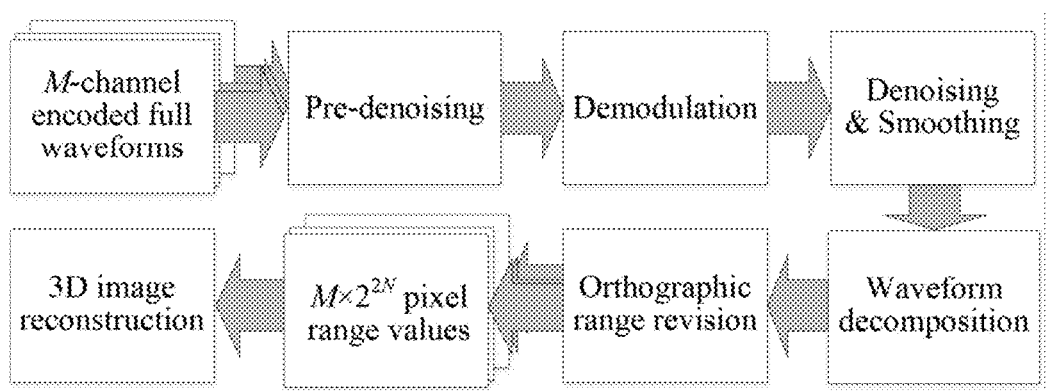
FIG. 4 is a flowchart of the signal processing for the CDMA-based focal plane array LIDAR using an N×N encoder and an M-element APD array.

FIG. 4 is a flowchart representing the signal processing approach of the encoded full waveforms. The M-channel encoded full waveforms acquired from the digitizer are processed as follows. First, pre-denoising algorithms are used to improve the quality of the encoded full waveforms. A wavelet threshold denoising algorithm is used in the embodiment. Second, signal demodulation is executed by correlating the encoded full waveforms with the local code sequences. Third, the demodulated characteristic waveforms of all pixels are further enhanced with denoising algorithms. Then, the range information of all pixels can be extracted. Finally, 3D image reconstruction is achieved after orthographic range revision and combining the pixels with GPS data.

Figure 5:
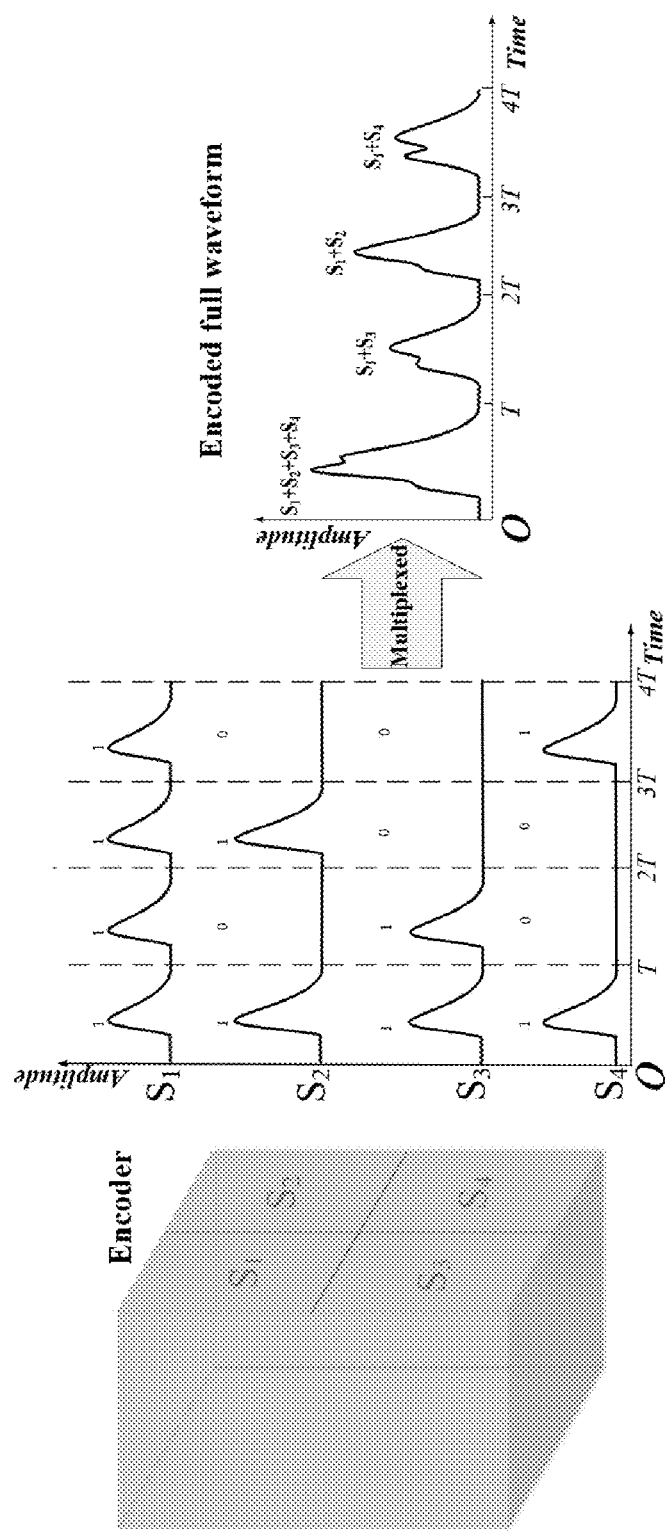
FIG. 5 is a schematic diagram of the generation of the encoded full waveform from a single APD under a 2×2 encoding condition.

FIG. 5 shows the process and final form of the encoded full waveform based on 2×2 plane encoding. In the embodiment, the size of the sections is 2×2 and marked by $S_1, S_2, S_3, S_4$. Thus, a 2×2 Walsh-Hadamard code matrix is employed, i.e., the code for $S_1$ is $\{1, 1, 1, 1\}$, the code for $S_2$ is $\{1, 0, 1, 0\}$, the code for $S_3$ is $\{1, 1, 0, 0\}$, and the code for $S_4$ is $\{1, 0, 0, 1\}$. Thus, the signal transformations through the four sections are shown in the left portion of FIG. 5 and the encoded full waveform is shown in the right portion. When the PRF has an assumed value of f=10 kHz, the time interval is T=0.1 ms and the entire encoding period is 0.4 ms.

Figure 6:
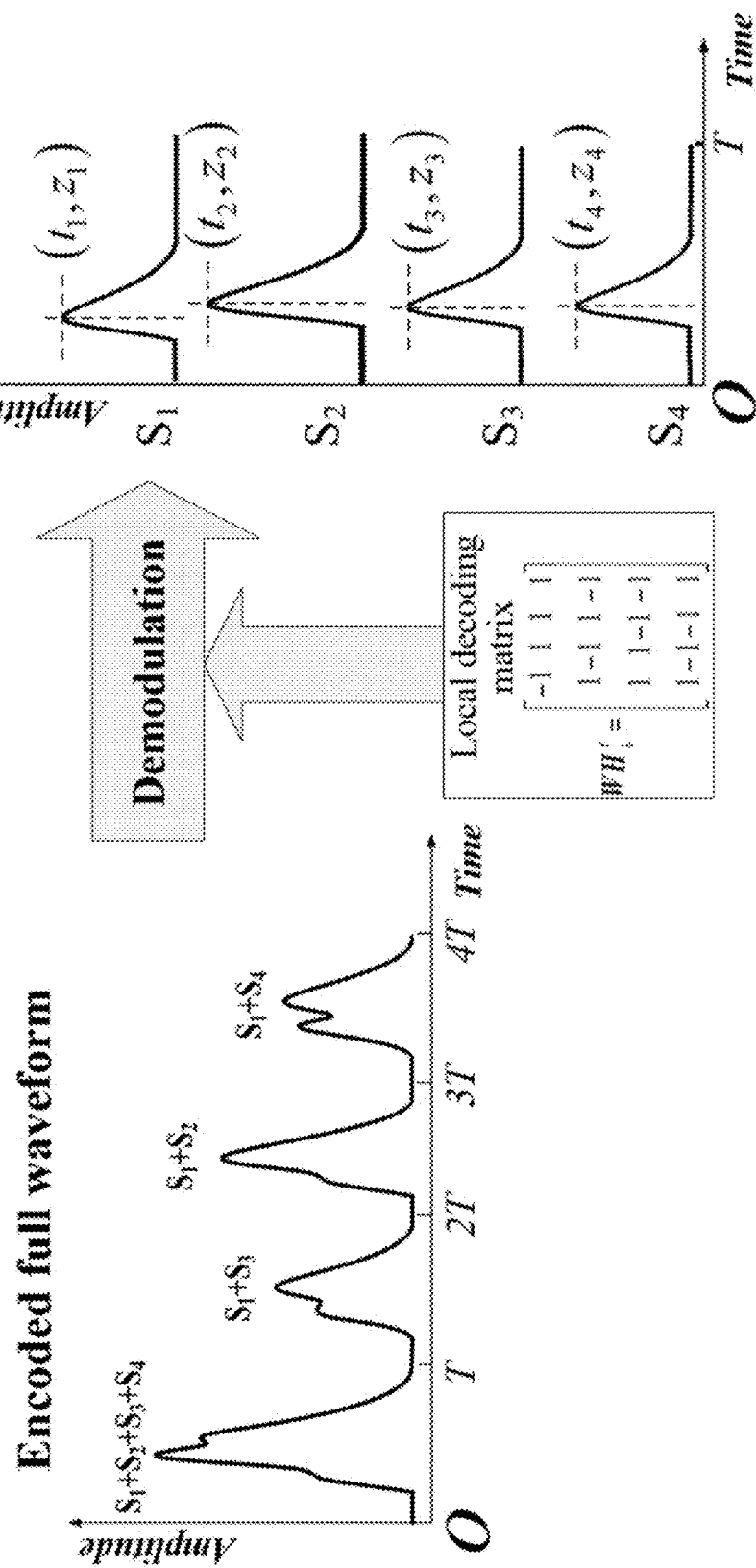
FIG. 6 is a schematic diagram of the demodulation operation of the encoded full waveform from a single APD under a 2×2 encoding condition.

FIG. 6 is a schematic diagram of the demodulation operation for the encoded full waveform from the 2×2 encoder. Using the waveform in FIG. 5 as an example, it is demodulated with the local decoding matrix for the characteristic waveforms of 4 pixels. Then the amplitudes and locations $\{t_i, z_i\}$, i=1, 2, 3, 4 relating to the intensity and depth values of the 4 pixels are finally obtained. The adopted local decoding matrix is bipolar and has the same order as the original encoding matrix. Most importantly, the two matrices are mutually orthogonal. For example, assuming the encoding matrix is $$WH_4 = \begin{bmatrix} S_1 \\ S_2 \\ S_3 \\ S_4 \end{bmatrix} = \begin{bmatrix} 1 & 1 & 1 & 1 \\ 1 & 0 & 1 & 0 \\ 1 & 1 & 0 & 0 \\ 1 & 0 & 0 & 1 \end{bmatrix},$$

then the period of encoded full waveform consists of 4 intervals, which respectively involves $S_1+S_2+S_3+S_4$, $S_1+S_3$, $S_1+S_2$, and $S_1+S_4$. To decompose the 4 components from the encoded full waveform, the local decoding matrix $$\overline{WH}_4 = \begin{bmatrix} -1 & 1 & 1 & 1 \\ 1 & -1 & 1 & -1 \\ 1 & 1 & -1 & -1 \\ 1 & -1 & -1 & 1 \end{bmatrix}$$

is utilized. The relationship between $WH_4$ and $\overline{WH}_4$ can be expressed as $$WH_4 \times \overline{WH}_4^T = \begin{bmatrix} 2 & 0 & 0 & 0 \\ 0 & 2 & 0 & 0 \\ 0 & 0 & 2 & 0 \\ 0 & 0 & 0 & 2 \end{bmatrix},$$

which represents good orthogonality. This means that, in order to obtain the information of the pixel $S_2$, we need to correlate the 2nd row of $\overline{WH}_4$[1 −1 1 −1] with the 4 intervals of the encoded full waveform and obtain:

$$[1 \quad -1 \quad 1 \quad -1] \begin{bmatrix} S_1+S_2+S_3+S_4 \\ S_1+S_3 \\ S_1+S_2 \\ S_1+S_4 \end{bmatrix} = 2S_2 = 2z_2 \cdot p(t-t_2) \quad (2)$$

where p(t) is the time distribution function of the laser pulse, which is theoretically Gaussian, i.e., $$p(t) = e^{-\frac{t^2}{2\sigma^2}},$$

where $\sigma$ is the half-width of the Gaussian pulse. Likewise, the other pixels can be obtained with the above method. Overall, the entire demodulation process can be deduced by the following equation:

$$\begin{bmatrix} -1 & 1 & 1 & 1 \\ 1 & -1 & 1 & -1 \\ 1 & 1 & -1 & -1 \\ 1 & -1 & -1 & 1 \end{bmatrix} \begin{bmatrix} S_1+S_2+S_3+S_4 \\ S_1+S_3 \\ S_1+S_2 \\ S_1+S_4 \end{bmatrix} = \begin{bmatrix} 2S_1 \\ 2S_2 \\ 2S_3 \\ 2S_4 \end{bmatrix} \quad (3)$$

Equation (3) demonstrates that the characteristic waveforms of the 4 pixels can be decomposed from the encoded full waveform by demodulation. Under normal circumstances, the plane size is assumed as $N'=2^N \times 2^N$ and the target is divided into N' sections $S_1, S_2, \ldots S_{N'}$. Then, the Walsh-Hadamard encoding matrix of order N' $WH_{N'}=[h_1 \ h_2 \ldots h_{N'}]$ is imposed. Here, $h_i$, i=1, 2, ... N' as the i-th row of the matrix represents the code for the i-th pixel. Furthermore, $h_i$ can be expressed as $h_i=(h_{ij})$, i,j=1, 2 ... N' where $h_{ij}$ is the j-th code element of either 1 or 0 of $h_i$. When the number of array elements is assumed as M, the N' sections are further divided into M groups of subsections $\{S_{i,1}, S_{i,2}, \ldots S_{i,N'}\}$, i=1, 2, ... M. Then the encoded full waveform acquired at the receiver can be expressed as:

$$y = \sum_{i=1}^{N'} \sum_{j=1}^{N'} h_{ij} \cdot z_j p(t-t_j-(i-1)\cdot T) \quad (4)$$

where the time interval is T=1/f, where f is the PRF. The vector form of equation (4) is:

$$Y = WH^{T} \times P = [h_1 h_2, \ldots h_{N'}] \times P = (y_i)_{N' \times 1} \quad (5)$$

where $P=[z_1 p(t-t_1) \ z_2 p(t-t_2) \ldots z_{N'} p(t-t_{N'})]^T$ and the dimension of Y is N'×1. In addition, $y_i$, i=1, 2, ... N' are the N' encoded waveforms within the N' intervals and can be described as:

$$y_i = \sum_{j=1}^{N} h_{ji} z_j p(t-t_j) i = 1, 2 \ldots N' \quad (6)$$

Considering that the echo signals are contaminated by various noises, the noise items are added to the encoded full waveforms Y that are thus converted to Y'. Correspondingly, $y_i$ is converted into $y'_i$:

$$y'_i = \sum_{j=1}^{N} h_{ji} z_j p(t-t_j) + \tilde{N}_i(t) \quad i = 1, 2 \ldots N' \quad (7)$$

where $\{\tilde{N}_i(t)\}$, i,j=1, 2, ... N' are the additive noises existing within N' intervals. According to the aforementioned demodulation method, a local decoding matrix $\overline{WH}_{N'}=[\overline{h}_1, \overline{h}_2 \ldots \overline{h}_{N'}]^T$ is employed. Here, the 1D code sequence is $\overline{h}_i$, i=1, 2, ... N' of which the code elements are $\overline{h}_i=(\overline{h}_{ij})$. Since $\overline{WH}_{N'}$ is bipolar, $h_i$ is either positive or negative $$h_i \cdot \overline{h}_j = \sum_{k=1}^{N'} h_{ik} \overline{h}_{jk} = \begin{cases} N'/2, & i=j \\ 0, & i \neq j \end{cases}$$

is required for the orthogonality between $\overline{h}_i$ and $h_i$. Therefore, the relationship between the local decoding matrix $\overline{WH}_{N'}$ and the original encoding matrix can be deduced as follows:

$$WH_{N'} \times \overline{WH}_{N'}^T = \qquad (8)$$

$$[h_1 \ h_2 \ ... h_{N'}]^T \times [\overline{h}_1 \ \overline{h}_2 \ ... \overline{h}_{N'}] = \begin{bmatrix} \frac{N'}{2} & 0 & ... & 0 \\ 0 & \frac{N'}{2} & ... & 0 \\ \vdots & \vdots & \ddots & \vdots \\ 0 & 0 & ... & \frac{N'}{2} \end{bmatrix}$$

The final result is a diagonal matrix representing good orthogonality between the two matrices. To obtain the k-th pixels, $\overline{h}_k$ is used to correlate with Y'. The process is:

$$\begin{aligned} \overline{h}_k \cdot Y' &= \sum_{i=1}^{N'} \overline{h}_{ki} y'_i \\ &= \sum_{i=1}^{N'} \overline{h}_{ki} \left( \sum_{j=1}^{N'} h_{ji} z_j p(t-t_j) + \tilde{N}_i(t) \right) \\ &= \sum_{j=1}^{N'} \left( \sum_{i=1}^{N'} \overline{h}_{ki} h_{ji} \right) \cdot z_j p(t-t_j) + \sum_{i=1}^{N'} \overline{h}_{ki} \tilde{N}_i(t) \\ &= \frac{N'}{2} z_k p(t-t_k) + \sum_{i=1}^{N'} \overline{h}_{ki} \tilde{N}_i(t) \end{aligned} \qquad (9)$$

$$k = 1, 2, ...N'$$

The result demonstrates that the characteristic waveforms of all pixels are successfully decomposed while a noise-related item $$\sum_{i=1}^{N'} \overline{h}_{ki} \tilde{N}_i(t)$$

is also introduced. In fact, the noise-related item is the result of correlating the noises with the code sequence. When noise-related item is significantly smaller than the pixel characteristic waveform term, the TOF information $t_k$ can be easily obtained by a waveform fitting method. In conclusion of FIG. 6, through use of the aforementioned demodulation method, the information of $N'=2^{2N}$ pixels is decomposed from a single-channel encoded full waveform, which means that the information of $M \times 2^{2N}$ pixels is obtained from the M-element APD array by using a $2^N \times 2^N$ focal plane array encoder under scannerless condition. For example, when the size of the focal plane array encoder is 16×16 and the number of APD elements is 64, 16384-pixels-per-frame 3D plane imaging is achieved without scanning, which is the equivalent performance of using the conventional imaging method with a 128×128-element APD array.

Figure 7:
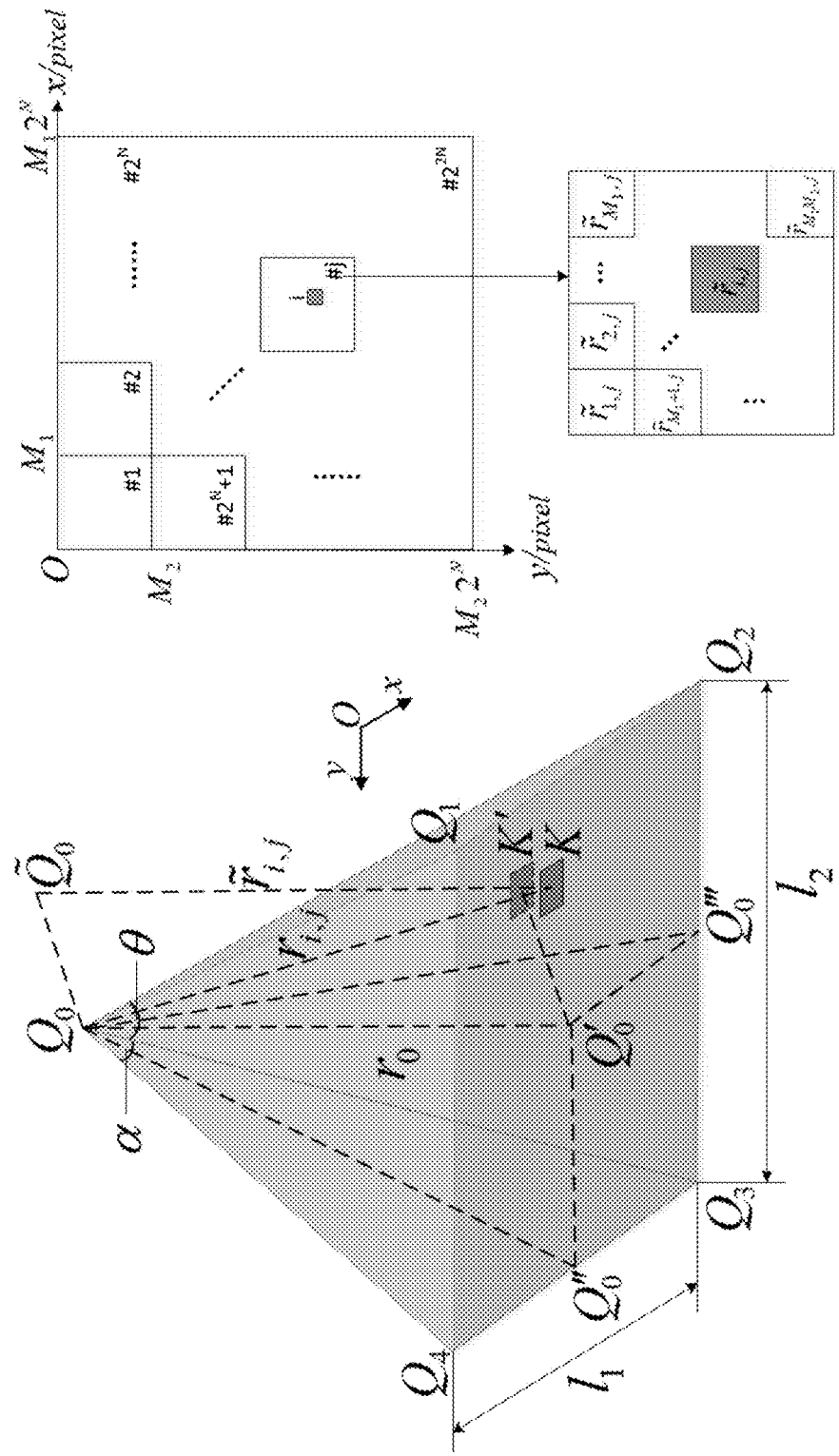
FIG. 7 is a schematic diagram of the beam space model for 3D image reconstruction of the CDMA-based focal plane array LIDAR.

FIG. 7 presents the space diagram of the orthographic projection for 3D image reconstruction. As mentioned before, the M groups of encoded full waveforms obtained from a $2^N \times 2^N$ plane array and an M-element APD array are digitally processed to produce $M \times 2^{2N}$ range values of the target, which requires orthographic conversion for 3D image reconstruction. As the vertical distance $r_0$ is far greater than the system size, the system's location can be regarded as a point $Q_0$. We assume that the FOV is $\alpha \times \theta$ where $\alpha$ is the horizontal field angle and $\theta$ the vertical angle. The projected light region on the surface is a rectangle $Q_1 Q_2 Q_3 Q_4$ with size $l_1 \times l_2$. The geometric relationship results in $$\begin{cases} l_1 = 2\sqrt{r_0^2 + (l_2/2)^2} \ \tan\frac{\alpha}{2} \\ l_2 = 2\sqrt{r_0^2 + (l_1/2)^2} \ \tan\frac{\theta}{2} \end{cases}, l_1$$

and $l_2$ can be finally expressed as:

$$\begin{cases} l_1 = 2\sqrt{\dfrac{r_0^2 \tan^2\frac{\alpha}{2}\left(1 + \tan^2\frac{\theta}{2}\right)}{1 - \tan^2\frac{\theta}{2}\tan^2\frac{\alpha}{2}}} \\ l_2 = 2\sqrt{\dfrac{r_0^2 \tan^2\frac{\theta}{2}\left(1 + \tan^2\frac{\alpha}{2}\right)}{1 - \tan^2\frac{\theta}{2}\tan^2\frac{\alpha}{2}}} \end{cases} \qquad (10)$$

Equation (10) means that when both the FOV $\alpha \times \theta$ and the vertical distance $r_0$ are given, the length and width of the rectangle region are fixed and can be computed by the equation. When the number of detectors is assumed as $M = M_1 \times M_2$ where $M_1$ and $M_2$ are integers, each of the $2^N \times 2^N$ rectangle sections is subdivided into $M_1 \times M_2$ subsections. That means the total number of plane array pixels is $M_1 2^N \times M_2 2^N (M \times 2^{2N})$ and the horizontal and vertical pixel resolutions can be expressed as:

$$\begin{cases} \Delta l_1 = l_1 / (M_1 2^N) \\ \Delta l_2 = l_2 / (M_2 2^N) \end{cases} \qquad (11)$$

The M groups of range values directly obtained by signal processing are labeled as $\{r_{1,1}, r_{1,2}, \ldots r_{1,2^{2N}}\}$, $\{r_{2,1}, r_{2,2}, \ldots r_{2,2^{2N}}\}, \ldots, \{r_{M,1}, r_{M,2}, \ldots r_{M,2^{2N}}\}$ for $M \times 2^{2N}$ for $M \times 2^{2N}$ subpixels. The first step for 3D image reconstruction is to convert the direct range values $r_{i,j}$ to the orthographic range values $\tilde{r}_{i,j}$. As shown in FIG. 7, when the location of the j-th pixel obtained from the i-th APD element is marked by point K, the length of $Q_0 K$ is thus $r_{i,j}$ and that of $\tilde{Q}_0 K$ is $\tilde{r}_{i,j}$. In addition, K' represents the projection point of K to the xOy plane. Thus, $Q_0 \tilde{Q}_0 K' Q_0'$ is a rectangle. When the unit of the xOy coordinate system is a pixel and the coordinate value of K and K' is $(x_{i,j}, y_{i,j})$, $\tilde{r}_{i,j}$ can be finally described as:

$$\tilde{r}_{i,j} = \sqrt{r_{i,j}^2 - (M_1 2^{N-1} - x_{i,j})^2 \Delta l_1^2 - (M_2 2^{N-1} - y_{i,j})^2 \Delta l_2^2} \qquad (12)$$

where $\Delta l_1$ and $\Delta l_2$ are described in equations (10) and (11), $M = M_1 \times M_2$, i=1, 2, ... M and j=1, 2, ... $2^{2N}$. The subfigure in the upper right shows the order of the $2^N \times 2^N$ pixels and is marked with #1~#$2^{2N}$. Furthermore, the multiplexed M subpixels from the j-th pixel are shown in the bottom right of the figure, in which the orthographic range values $\tilde{r}_{1,j}, \tilde{r}_{2,j}, \ldots \tilde{r}_{M_1 M_1, j}$ are filled. Here, $\tilde{r}_{i,j}$, i=1, 2, ..., $M_1 M_2$, represents the orthographic range value of the j-th subpixel multiplexed by the i-th detector. According to the presented space distribution of these subpixels, their locations can be determined by:

$$\begin{cases} x_{i,j} = M_1((j-1) \bmod 2^N) + (i-1) \bmod M_1 + 1 \\ y_{i,j} = M_2 \lfloor (j-1)/2^N \rfloor + \lfloor (i-1)/M_1 \rfloor + 1 \end{cases} \quad (13)$$

In conclusion, the process of 3D image reconstruction is as follows:

(1) According to the equation (12), the direct range values $\{r_{1,1}, r_{1,2}, \ldots r_{1,2^{2N}}\}$, $\{r_{2,1}, r_{2,2}, \ldots r_{2,2^{2N}}\}$, ..., $\{r_{M,1}, r_{M,2}, \ldots r_{M,2^{2N}}\}$ of the M groups of pixels are first converted to orthographic range values $\{\tilde{r}_{1,1}, \tilde{r}_{1,2}, \ldots \tilde{r}_{1,2^{2N}}\}$, $\{\tilde{r}_{2,1}, \tilde{r}_{2,2}, \ldots \tilde{r}_{2,2^{2N}}\}$, ..., $\{\tilde{r}_{M,1}, \tilde{r}_{M,2}, \ldots \tilde{r}_{M,2^{2N}}\}$.

(2) All locations $(x_{i,j}, y_{i,j})$, $i=1, 2, \ldots M$; $j=1, 2, \ldots 2^{2N}$ of the $M \times 2^{2N}$ pixels are obtained by equation (13) and correspond to an xOy coordinate system. The orthographic range values $\tilde{r}_{i,j}$ are filled as the depth value in the cell of the corresponding location. Thus, the range image is complete. Its horizontal pixel resolution and vertical pixel resolution can be computed with equations (10) and (11).

(3) The 3D image of the target is finally restored by combining the range image with the GPS data of all pixels.

As an example, when the FOV is assumed as $\alpha \times \alpha$, the projected region is a $2^N \times 2^N$-cell square with the length $$l = \frac{2r_0 \tan\frac{\alpha}{2}}{\sqrt{1 - \tan^2\frac{\alpha}{2}}}.$$

Furthermore, when M is a square number, each pixel cell will be further divided into $\sqrt{M} \times \sqrt{M}$ square sub-cells namely subpixels. Under this condition, both of the horizontal and vertical pixel resolutions are $$\Delta l = \frac{2r_0 l \tan\frac{\alpha}{2}}{2^N \sqrt{M\left(1 - \tan^2\frac{\alpha}{2}\right)}}.$$

The equation for the orthographic range conversion is thus $$\tilde{r}_{i,j} = \sqrt{r_{i,j}^2 - \left(\sqrt{M} \, 2^{N-1} - x_{i,j}\right)^2 \Delta l^2 - \left(\sqrt{M} \, 2^{N-1} - y_{i,j}\right)^2 \Delta l^2},$$

where $\sqrt{M}+1 x_{i,j} = \sqrt{M}(j \bmod 2^N-1) + i \bmod \sqrt{M}$, $$y_{i,j} = \sqrt{M} \lfloor (j-1)/2^N \rfloor + \lfloor (i-1)/\sqrt{M} \rfloor + 1,$$

$i=1, 2, \ldots M$, $j=1, 2, \ldots 2^{2N}$.

Projecting all the $\tilde{r}_{i,j}$ values to the locations $(x_{i,j}, y_{i,j})$ of an xOy coordinate system and including the GPS data, we can finally reconstruct the 3D image of the target.

What is claimed is:

1. A CDMA-based 3D imaging method for focal plane array LIDAR comprising:
   (1) Encoding: shaping a pulsed laser into a flat-top laser beam with a rectangular cross-section by a beam shaper; dividing and encoding the shaped flat-top laser beam into $2^N \times 2^N$ encoded sections by a $2^N \times 2^N$-element encoder, where N is a positive integer, in which all sections are sequentially $2^{2N}$-order CDMA-encoded; projecting the encoded beam onto $2^N \times 2^N$ sections of a target surface;
   (2) Multiplexing: subdividing the $2^N \times 2^N$ sections of the target surface to obtain $2^N \times 2^N$ pixel sections and multiplexing a plurality of echo signals by an M-element detector array, such that each detector element receives the echo signals from $2^N \times 2^N$ object points; a plurality of code element attributes of these object points comprising a complete group of codes, each detector element receives a $2^{2N}$-order encoded full echo signal, thus the echo signals of $M \times 2^{2N}$ object points is received by an M-element detector array;
   (3) Processing: high-speed sampling of M of the $2^{2N}$-order encoded full echo signals from the M-element detector array to obtain M groups of encoded full waveform data; each group comprising data from $2^{2N}$ pixels, in which a sampling rate satisfies the Nyquist sampling theorem to enable undistorted signal reconstruction; processing the encoded full waveform data to retrieve a range information of all $M \times 2^{2N}$ pixels; reconstructing a 3D image of the target via focal plane array-based 3D reconstruction,
   wherein the encoding step comprising: the $2^N \times 2^N$-element encoder dividing the cross section of the laser beam into $2^N \times 2^N$ sections $S_1, S_2, \ldots, S_{2^{2N}}$ and sequentially performing $2^{2N}$-order plane-array encoding in both space and time dimensions with an unipolar code matrix $WH_{N'}=[h_1 \, h_2 \, \ldots \, h_{N'}]^T$, where $N'=2^{2N}$ and $h_i=(h_{ij})$, $i,j=1, 2 \ldots N'$ are code sequences, of which a plurality of code elements $h_{ij}$ are either '1' or '0', respectively corresponding to an on or off control of the encoder;
   wherein the multiplexing step comprising: labeling the $2^N \times 2^N$ pixel sections divided on the target as $S_1, S_2, \ldots, S_{2^{2N}}$ and subdividing each pixel section into $M=M_1 \times M_2$ subpixels, where $M_1$ and $M_2$ being positive integers, thus labeling the pixel sections as $\{S_{1,1}, S_{2,1}, \ldots, S_{M,1}\}$, $\{S_{1,2}, S_{2,2}, \ldots, S_{M,2}\}$, ..., $\{S_{1,2^{2N}}, S_{2,2^{2N}}, \ldots, S_{M,2^{2N}}\}$; thus, the $2^N \times 2^N$ pixel sections being subdivided into $M_1 2^N \times M_2 2^N$ subpixels in which a plurality of $M_1 \times M_2$ subdivided sections from each section corresponding to a same encoding attribute; regrouping the subdivided sections into M groups $\{S_{1,1}, S_{1,1}, \ldots, S_{1,2^{2N}}\}$, $\{S_{2,1}, S_{2,2}, \ldots, S_{2,2^{2N}}\}$, ..., $\{S_{M,1}, S_{M,2}, \ldots, S_{M,2^{2N}}\}$ by selecting the subdivided section with the same index M from each section, in which each group comprising a complete encoding group; multiplexing and receiving the echo signals by the M-element detector array, in which the echo signals from the $2^{2N}$ subpixels of a same group being fed to one detector element, and the same group is one of the M groups, thereby achieving the reception of echo signals from $M \times 2^{2N}$ object points with a single M-element detector array,
   wherein the step of (3) processing further comprising:
   (i) pre-denoising: performing denoising on an entire encoding interval, in which a denoising strength is controlled to avoid loss of detail;
   (ii) demodulation: demodulating an i-th group of the encoded full waveforms data with local code sequences to obtain characteristic waveforms of $2^{2N}$ pixels involving $2^{2N}$ time-of-flight information $\{t_{i,1}, t_{i,2}, \ldots t_{i,2^{2N}}\}$ of sections $\{S_{i,1}, S_{i,2}, \ldots S_{i,2^{2N}}\}$ where $i=1, 2, \ldots M$;

(iii) denoising: executing smoothing and denoising algorithms to enhance the characteristic waveforms of the M×2$^{2N}$ pixels';

(vi) decomposition: performing fitting decomposition on the characteristic waveforms to extract M×2$^{2N}$ time-of-flight values $\{t_{i,j}\}$, i=1, 2, . . . M and obtain direct flight ranges of the M×2$^{2N}$ pixels $\{r_{i,j}\}$ in accordance with an equation $r_{i,j}=c \cdot t_{i,j}/2$, where c is the light velocity;

(v) plane-array 3D image reconstruction: performing orthographic projection transformation on the direct flight ranges of the M×2$^{2N}$ pixels $\{r_{i,j}\}$ in conjunction with a spatial distribution of the pixels and a viewing angle to obtain the pixels' actual depth values; performing pixel splicing according to a focal plane array-based pixel multiplexing rule and reconstructing the 3D image in combination with GPS data of the pixels.

2. The CDMA-based 3D imaging method for the focal plane array LIDAR according to claim 1, wherein the local code sequences $\overline{WH}_{N'}=[\overline{h}_1\ \overline{h}_2\ \ldots\ \overline{h}_{N'}]^T$, employed to demodulate the characteristic waveforms of the M×2$^{2N}$ pixels from M groups of the encoded full waveforms are bipolar and mutually orthogonal to an original encoding code sequences $WH_{N'}=[h_1\ h_2\ \ldots\ h_{N'}]^T$, that is, $WH_{N'} \times \overline{WH}_{N'}^T$ is a diagonal matrix; thus the i-th group of encoded full waveforms can be demodulated into the characteristic waveforms of the 2$^{2N}$ pixels involving 2$^{2N}$ time-of-flight information $\{t_{i,1}, t_{i,2}, \ldots t_{i,2^{2N}}\}$ sequentially belonging to the 2$^{2N}$ sections $\{S_{i,1}, S_{i,2}, \ldots S_{i,2^{2N}}\}$ where i=1,2, . . . M.

3. The CDMA-based 3D imaging method for focal plane array LIDAR according to claim 1, wherein the plane-array-based 3D image reconstruction further comprising:

(i) performing an orthographic projection transformation on the direct flight ranges $\{r_{i,j}\}$ according to a second equation $$\tilde{r}_{i,j} = \sqrt{r_{i,j}^2 - (M_1 2^{N-1} - x_{i,j})^2 \Delta l_1^2 - (M_2 2^{N-1} - y_{i,j})^2 \Delta l_2^2}$$

where $M=M_1 \times M_2$, i=1, 2, . . . M, j=1, 2, 2$^{2N}$, $x_{i,j}=M_1((j-1)\bmod 2^N)+(i-1)\bmod M_1+1$ $y_{i,j}=M_2 \lfloor (j-1)/2^N \rfloor + \lfloor (i-1)/M_1 \rfloor +1$, $\Delta l_1=l_1/(M_1 2^N)$, $\Delta l_2=l_2/(M_2 2^N)$;

(ii) pixel splicing: establishing a 2D coordinate system x0y, mapping an orthographic range values of the M×2$^{2N}$ pixels $\{\tilde{r}_{i,j}\}$ to the locations $(x_{i,j},y_{i,j})$, i=1,2, . . . M; j=1,2, . . . 2$^{2N}$ as a pixel depth values of the pixels, thus completing a 2D range image reconstruction with a horizontal resolution of $\Delta l_1$ and a vertical resolution of $\Delta l_2$;

(iii) 3D image reconstruction: combining the 2D range image with the GPS data of all pixels.

* * * * *